July 9, 1935.  W. GUMPRICH  2,007,394
LEVER SYSTEM
Filed March 10, 1932  3 Sheets-Sheet 1
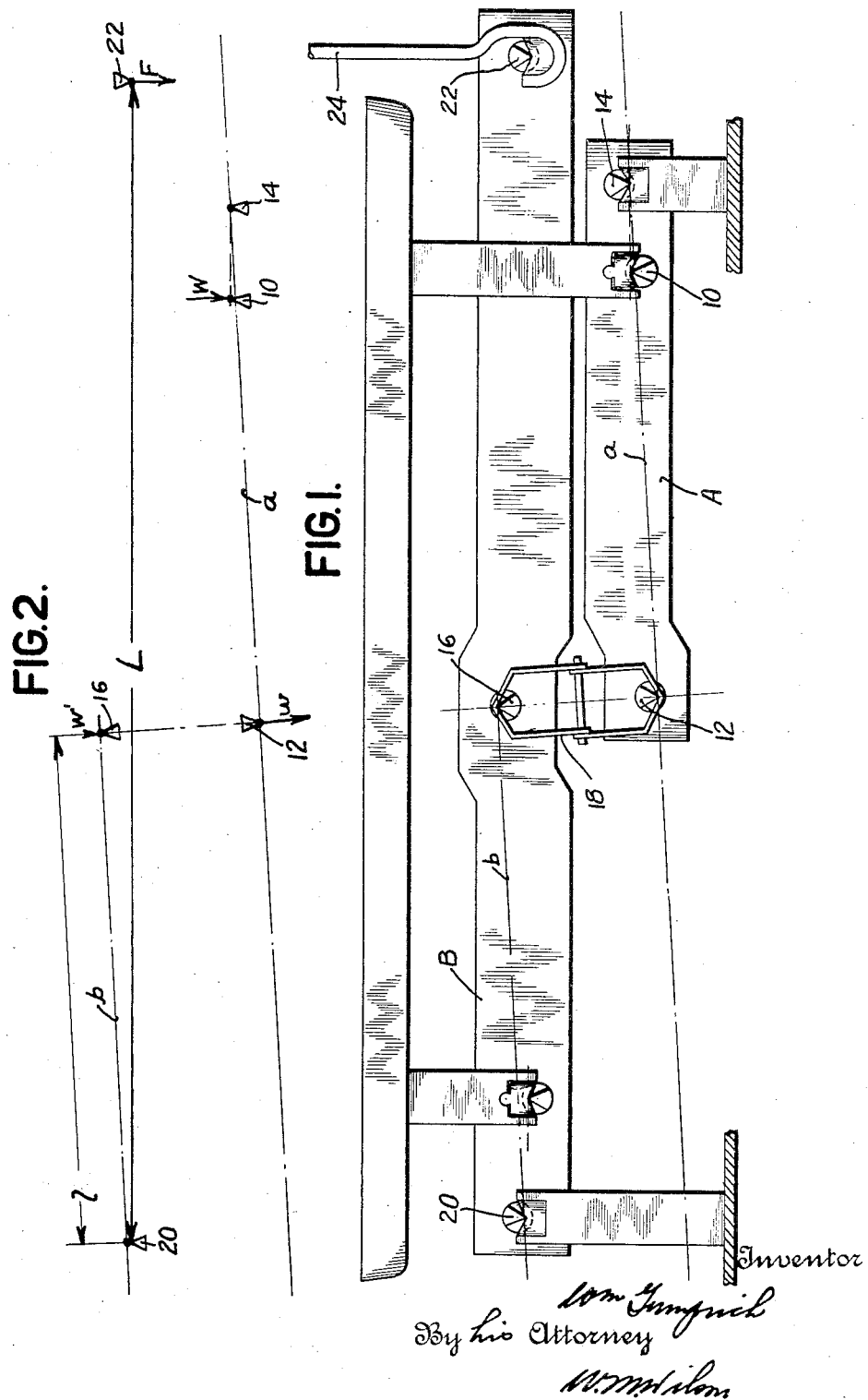

July 9, 1935.  W. GUMPRICH  2,007,394
LEVER SYSTEM
Filed March 10, 1932  3 Sheets-Sheet 2
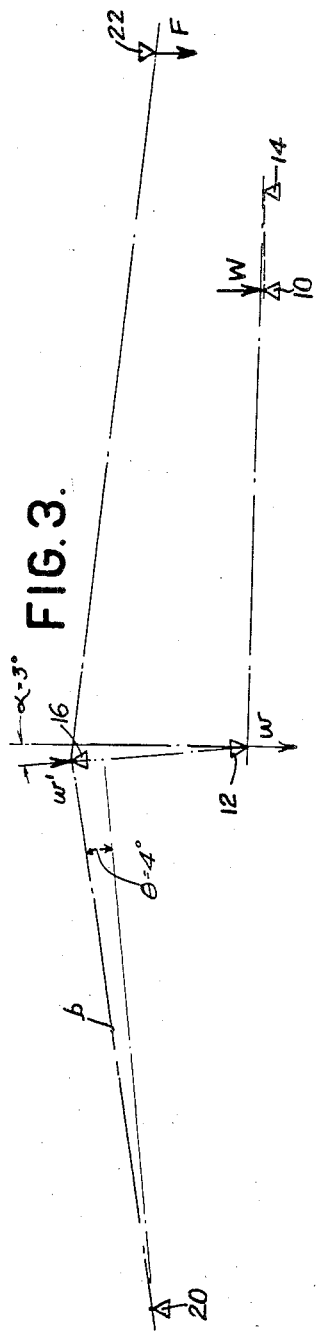
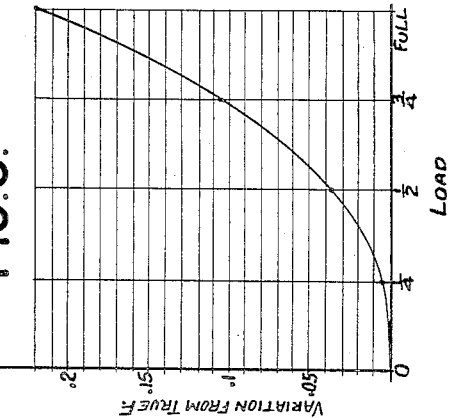
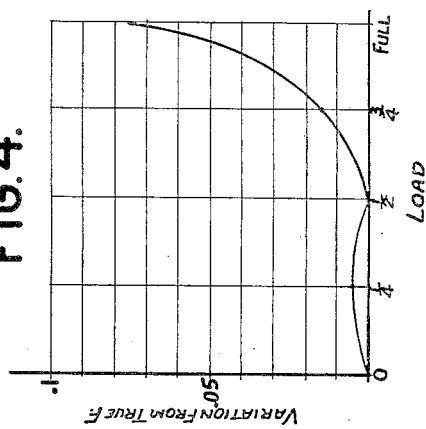
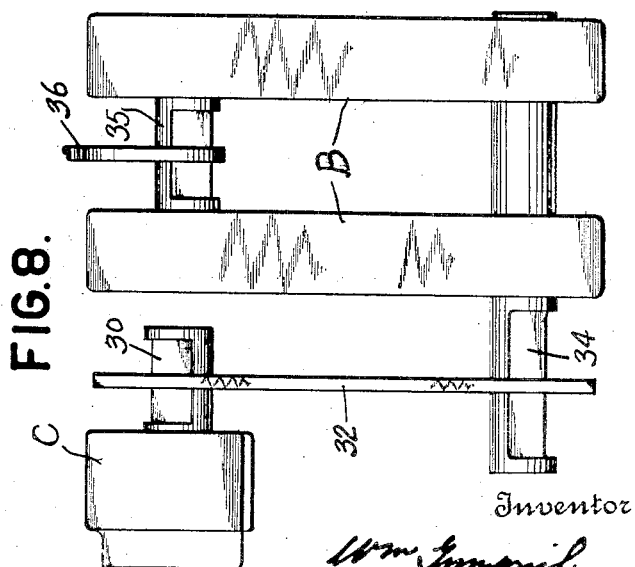
Inventor
Wm Gumprich
By his Attorney July 9, 1935.  W. GUMPRICH  2,007,394
LEVER SYSTEM
Filed March 10, 1932  3 Sheets-Sheet 3
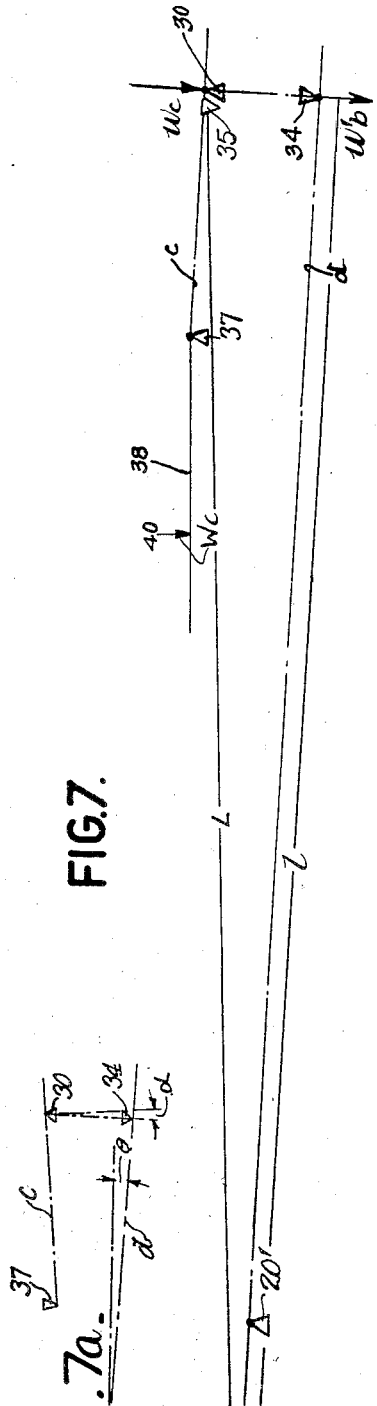
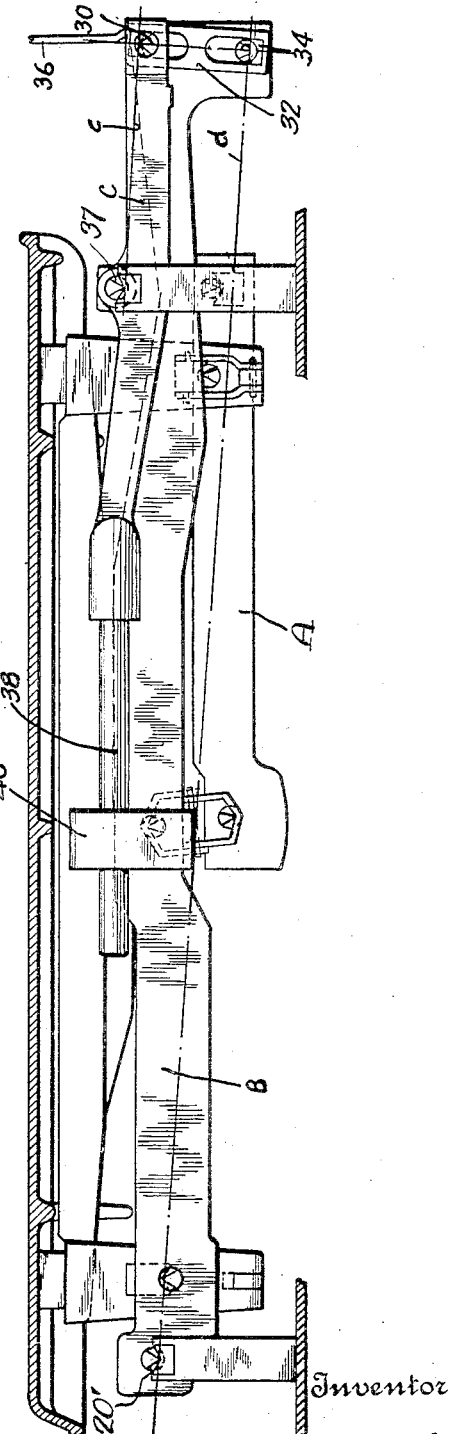

Patented July 9, 1935

2,007,394

UNITED STATES PATENT OFFICE 2,007,394

LEVER SYSTEM

William Gumprich, Brooklyn, N. Y., assignor, by mesne assignments, to International Business Machines Corporation, New York, N. Y., a corporation of New York Application March 10, 1932, Serial No. 597,956

13 Claims. (Cl. 265—71)

This case relates to weighing scales and particularly to the connected levers thereof.

The object of the invention is to provide improved means and methods of connecting levers so that the errors due to rotational movements of the levers will be a minimum.

More specifically, the object of the invention is to provide a connection between a pair of levers which will transmit the force from one lever to the other with the minimum of error for all positions of the levers.

Another object is to have the fixed load on a backweight lever, or the like, act on the lever with a minimum of variation resulting from angular movement of the lever.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a side view of the base levers of the scale in mid-position and indicating the range and force lines.

Fig. 2 is a diagram of the range and force lines of Fig. 1.

Fig. 3 is a view similar to Fig. 2 showing the parts in different positions.

Fig. 4 is a graph of the variations from normal in the structure of the present invention under different loading conditions.

Fig. 5 is a graph of such variations under prior practice.

Fig. 6 is a view of the main lever or long lever connected to a short auxiliary lever as in Fig. 1 and also connected to the backweight lever in mid-position, Fig. 7 is a diagram of the force lines and forces at mid-position between the long lever and the backweight lever, shown in Fig. 6, and Fig. 7a is a detail diagrammatic view of some of the elements of Fig. 7 at zero load position.

Fig. 8 is a rear end view of the main and backweight levers.

Referring to Figs. 1, 2, and 3 let $W$=the applied force on auxiliary lever A at pivot 10, $w$=the resulting pull at pivot 12 acting perpendicular to the line joining the fulcrum 14 of the lever A and pivot 12, this line being termed the "force" line $a$, $w'$=the pull of lever A on pivot 16 transmitted through connecting link 18, $L$=the distance between fulcrum 20 of the lever B and the draft point 22, $l$=the distance between fulcrum 20 and pivot 16, and $b$=the force line joining them, and $F$=the pull at the pivot 22 on the draft rod 24.

The simple trigonometric relation between $w$ and $w'$ is:

$w' = w \cos \alpha$ where $\alpha$ is the angle between the line joining the pivots 12 and 16 and a line perpendicular to the force line $a$.

The moment M of $w'$ on lever B may be expressed as:

$w'l \cos \theta$ where $\theta$=the angle between the force line $b$ and a line perpendicular to the line joining pivots 12 and 16.

If in $M = w'l \cos \theta$, we substitute for $w'$ its value $w \cos \alpha$, we get $M = lw \cos \alpha \cos \theta$.

The moment of F may be taken as equal to the moment of $w'$ or $$FL = M$$

or $$F = \frac{M}{L}$$

$$F = \frac{lw}{L} \cos \alpha \cos \theta$$

In Figs. 1 and 2, the levers are in mid-position, that is if the levers swing through a total arc of 8° from zero load to full load, then the levers are shown after they have swung from no load position through an arc of 4°. As shown in Figs. 1 and 2, when the levers are in mid-position the line joining pivots 12 and 16 is perpendicular to both the force line $a$ of the auxiliary lever A and the force line $b$ of the main lever B. In this case both $\alpha$ and $\theta$ are zero.

F will then be $$F = \frac{l}{L} w \cos 0° \cos 0°$$

or $$w\frac{l}{L}$$

since $$\cos 0° = 1$$

Assume that a lighter load is placed on the scale and the levers approach close to the zero positions. Since the line joining pivots 12 and 16 is perpendicular to lines $a$ and $b$ in mid-position, then as pivots 12 and 16 move upward, they move apart laterally describing arcs about the fulcrums of the levers. The line joining pivots 12 and 16 is no longer perpendicular to lines $a$ and $b$ as may be seen from Fig. 3.

Assume that $\alpha$ now equals 3° and $\theta$ equals 4° then $$F = \frac{l}{L} w \cos 3° \cos 4°$$

$$\cos 3° = .9986$$
$$\cos 4° = .9976$$

or $$F = \frac{l}{L} w (.9962)$$

Assume now the load increases so the levers move down the same amount as, in the previous example, they moved up upon decrease of the load. Again, the pivots 12 and 16 will move apart laterally from the positions shown in Figs. 1 and 2 as they describe arcs about the lever fulcrums.

Assume that $$\alpha = 4°$$

and $$\theta = 3°$$

then again $$F = \frac{lw}{L}(.9962)$$

thus whichever way that the levers move from their mid-position, the angles $\alpha$ and $\theta$ increase from 0° since the line joining the pivots 12 and 16 departs from the perpendicular to lines $a$ and $b$.

If the scale be of a 500 pound capacity, and fully loaded, $w$ will equal approximately ⅕ of W which is 250 since only half the load is transmitted to the lever A or $w=50$.

Further if $$l = \text{approximately } \frac{1}{2.5} \text{ of } L$$

then $$F = \frac{1}{2.5}(50)(.9962)$$

or variation in F from mid-position to full load position equals $$\frac{1}{2.5}(50)(.0038) = 0.076 \text{ lbs.}$$

The curve of variations will be approximately as indicated in Fig. 4.

In the prior art, at no load or zero position, connection between the levers was at right angles to the line joining the connecting points to the fulcrums on the force lines. Thus, Fig. 1 may represent the levers and connections between them at zero load position as known to the prior art.

As the levers departed from zero position, the line joining them would also depart from the perpendicular to the lines $a$ and $b$ but the departure would increase progressively from zero load to maximum load, since under any load above zero, the levers move downward.

We have found that $$F = \frac{l}{L} w \cos \alpha \cos \theta$$

Thus at mid-load in a 500 pound capacity scale, assume $\alpha = 3°$ and $\theta = 4°$ then the variation from zero position will be $$\text{variation in } F = \frac{l}{L} w(.0038)$$

since at mid-load $$W = \frac{1}{2} \times 250 = 125$$

then $$w = 25$$

and $$\text{variation in } F = \frac{1}{2.5} \times 25(.0038) = .038$$

At full load assume $\alpha = 6°$ and
$$\theta = 6°$$
then
$$\cos \alpha = .9945$$
$$\cos \theta = .9945$$
$$\cos \alpha \cos \theta = .9890$$

or variation $\cos \alpha \cos \theta$ from zero-load $= .011$

Now at full load $w = 50$ or $$\text{variation in } F = \frac{1}{2.5} \times 50 \times .011 = 0.22$$

The curve of variations will be approximately as shown in Fig 5.

The difference in maximum variation in force transmitted to the draft rod 24 between applicant's construction and previous practice is thus the difference between .076 and .22 equal to 0.144. In other words, by arranging and locating the levers, their pivots, and link 18 so that the line joining pivots 12 and 16 is perpendicular to force transmission lines $a$ and $b$ of levers A and B respectively, at mid-load position, the maximum variation is .144 pounds less than under the prior practice where the link equivalent to 18 is placed at right angles to the force lines of the levers when the latter are in zero position.

It will be noted from Fig. 4 that in applicant's scheme an average variation of about .035 may be determined and that this variation will be approximately the true variation for all the load positions of the scale, whereas under known prior practice, the average variation will be quite different from the true variation as the load approaches a maximum. It is thus possible to seal out applicant's scale to greater exactness than scales of prior construction.

Fig. 6 shows the long or main lever B connected to the short auxiliary lever A as in Fig. 1 and also connected to a back-weighting lever C. The lever C is connected to the nose end of the lever B to counteract the dead weight of the platform parts and levers and exclude the dead weight from the weighing calculation. As the right hand arm of the lever C is shorter than the right hand arm of the lever B, the levers do not swing through the same angles and to prevent binding of the levers against their fulcrums, they are connected through means which includes a link 32. The link 32 permits the levers B and C to swing through different angles without binding. As shown in Fig. 8, the nose iron or pivot 30 of lever C is connected through link 32 to pivot 34 of lever B which is at the same distance from fulcrum 26' of lever B as the nose pivot 35 of lever B which is connected to draft rod 36.

The backweighting force of lever C is supplied by weight 40 on arm 38 of the lever C. The resulting force transmitted by the lever C to lever B is not constant, as is ideally desired, but varies with the angle of the link 32 relative to the force lines of the levers in relation to the link. To determine the variation at different load positions from the force which should be transmitted by link 32 to lever B as a result of the force applied to lever C, let $Wc$ = the force applied to lever C as by weight 40,
$wc$ = the resulting pull at pivot 30 acting perpendicularly to a line passing through the fulcrum 37 of the lever C and the bearing point of pivot 30, this line being termed the force line $c$,
$w'b$ = the pull of lever C on pivot 34 transmitted through connecting link 32,
$L$ = the distance between the fulcrum 20' of the lever B and the nose iron 35,
$l$ = the distance between the fulcrum 20' of the lever B and the pivot 34 which is the point of connection of link 32 to lever B,
$d$ = the force line passing through the fulcrum of lever B and said point of connection at 34,
$F'$ = pull on draft rod 36,
$\alpha$ = the angle between the line joining the pivots 30 and 34 and a line perpendicular to the force line $c$,
$\theta$ = the angle between the line perpendicular to the line joining pivots 30 and 34 and the force line $d$;

The trigonometric relationships of the forces are similar to the previous case explained in connection with Fig. 1.

$w'b = wc \cos \alpha$ and the moment $M'$ of $w'b$ on lever B is $w'bl \cos \theta$ or $lwc \cos \alpha \cos \theta$; also, since $F'L = M'$ $$F' = \frac{l}{L} wc \cos \alpha \cos \theta$$

Since pivots 34 and 35 are equidistant from fulcrum 20' of lever B, then $l$ and $L$ are equal and $F' = wc \cos \alpha \cos \theta$. Since in the mid-load position shown in Fig. 6 cos $\alpha$ and cos $\theta$ are both equal to 0, F' is equal to $wc$ and the ideal condition is obtained of transmitting the full backweight force of lever C to lever B. Assume that the lever B moves upward to substantially zero position upon the decrease of load so that the angle $\alpha$ becomes 3° and the angle $\theta$ becomes 4° then $F' = wc \cos 3°$ cos 4° or $F' = wc(.9962)$. Thus if $w$ is equal to 25 pounds then $F = 24.905$ and the variation between the normal pull F' of 25 pounds at mid-position and the pull F' at approximately zero position of lever B is equal to .095.

When the lever B moves to its substantially full load position then $\alpha$ and $\theta$ will again be equal to about 3° and 4° and again the variation between F' at mid-load position and full load position will be .095. If Fig. 6 showed the position at zero instead of at mid-load postion, then at full load position of lever B $\alpha$ and $\theta$ would each be approximately 6° and F' would equal 25(.989) or the variation between F' at full load position and zero position would equal 25(.011) = .275.

The difference in maximum variations between applicant's construction wherein the line joining pivots 30 and 34 is at right angles to the force lines of the levers B and C at mid-position and a construction wherein the line joining pivots 30 and 34 is at right angles to the force lines of levers B and C at zero position is equal to .18 pounds.

In a scale wherein the levers A, B, and C are combined, the sum of the difference between maximum variations of the force transmitted to the draft rod between applicant's and constructions according to prior principles is equal to .144 and .18 or .324 pound. Thus for an approximately 500 pound capacity scale, applicant's construction is .324 pound more accurate at the draft point at full capacity than scales constructed on previous principles.

While I have selected for examples certain capacities of scales and certain changes in angular relation between the link joining the lever and the force lines of these levers, it is obvious that the pull at the draft point in applicant's construction becomes greater or less in proportion when the capacity of the scale is greater or less. In principle, however, applicant's construction always gives a minimum variation.

In Fig. 1 it will be noted that lever C at mid-load position has the weight carrying arm 38 extending horizontally. Thus as the lever C moves upward or downward upon reduction or increase of load as the case may be, the downward pull of the weights such as 40 on arm 38 varies from a normal at mid-load position in accordance with the angle the weights make with a vertical line. The maximum variation of angles between 38 and a horizontal line is about half that it would be if 38 were horizontal at the no-load position and progressively moved upward to a maximum load position. Since by making arm 38 of applicant's device horizontal at mid-load position the variation in effective gravitational pull of weights 40 due to change in angularity of said arm is about half that it would be if arm 38 were horizontal at zero position, it is much easier to seal out the error due to said changes in angularity of arm 38.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a scale of a particular capacity, a main lever and an auxiliary lever movable in common from zero to full load positions and a connecting element from the auxiliary lever to the main lever extending effectively perpendicular to the line joining the connection of the element with the auxiliary lever and the fulcrum of the latter when the auxiliary lever is in mid-position.

2. In a scale, a movable load-responsive lever, a backweight lever for resisting such movement, and a link connection between said levers, said link extending effectively perpendicular to the force lines of said levers at mid-load position, the force line of each lever being a line joining the fulcrum of this lever with the point of connection of this lever with the link.

3. In a scale having a load support, a lever movable in response to a load on said support, an auxiliary lever for exerting a force on the first-mentioned lever, and a connection between said levers for transmitting the force of the auxiliary lever to the first-mentioned lever at a point of the latter substantially at the nose or power end thereof, said connection being effectively perpendicular to the force lines of said levers at mid-load position, the force line of each lever being a line joining the fulcrum of this lever with the point of engagement of this lever with said connection.

4. In a scale, a pair of levers having a predetermined arc of travel, and a connecting element between the levers extending effectively perpendicular to the line joining the fulcrum of one of the levers with the point of connection of the element to said one of the levers when the levers are in mid-position.

5. In a scale, a pair of levers movable from a zero to a full load position and a connecting element between the levers extending perpendicular to the lines joining the fulcrum of each lever with the point of connection thereof with the said element when the levers are mid-way between zero and full load position.

6. In a scale, a load-responsive main lever, a platform having a pivoted support on the lever, a draft rod connected to the latter and urged in one direction thereby, and an auxiliary backweighting lever below the platform and extending longitudinally in the same direction as the main lever for urging said draft rod in the opposite direction, and a link connection between the backweighting lever and the end of the main lever connected to the draft rod, said levers having different lengths of arms between their fulcrums and their points of connection with the link whereby the levers rock through different angles, the link connection permitting the levers to rock through different angles without binding of the levers against their fulcrums.

7. In a scale such as defined in claim 6, said link connection extending perpendicular to the force lines of said levers when the levers are in mid position the force line of each lever being a line joining the fulcrum of this lever with the point of connection of this lever with the link.

8. In a scale having a lever movable under the influence of the load, an auxiliary lever for resisting such movement of the first-mentioned lever, said auxiliary lever having a weighted arm extending horizontally at mid-load position whereby the effective gravitational force of the weighted arm varies equally upon movement of said lever clockwise or counterclockwise.

9. In a scale, a pair of levers with their longitudinal axes extending in the same direction and having a predetermined arc of travel, and a connecting element between them for transmitting the force of one lever to the other, the force lines of said levers being parallel to each other when the levers are in mid-position, the force line of each lever being a line joining the fulcrum of this lever with the point of connection of this lever with said connection element, said connecting element extending effectively perpendicular to the force lines at said mid-position.

10. In a scale, a pair of load responsive levers having a predetermined arc of travel from zero to full load, a link connecting said levers, said link extending effectively perpendicular to the force lines of said levers at an intermediate load position, the force line of each lever being a line joining the fulcrum of this lever with its point of connection to the link.

11. In a scale, a load support, a pair of generally horizontally extending levers, connections from opposite ends of aforesaid load support to said levers at equal distances from the lever fulcrums to provide equal load arms, each lever thereby having an equal part in sustaining said support, and an operating connection between the levers extending effectively perpendicular to the force lines of said levers at the mid-load positions of the levers.

12. In a scale, a load support, a pair of generally horizontally extending levers fulcrumed to rock in opposite rotational directions, connections from the opposite ends of the load support to the levers at equal distances from the lever fulcrums to provide equal load moment arms of the levers for sustaining said support, and an operating link connection between equal power arms of the levers extending effectively perpendicular to the force lines of the levers at substantially the mid-load positions of the levers.

13. In a scale, a goods platform, a pair of generally horizontally extending levers fulcrumed to rock in opposite rotational direction, connections from the opposite ends of the platform to the levers at equal distances from the lever fulcrums to provide equal load moment arms of the levers below the platform for supporting the platform, and an operating connection between equal power arms of said levers extending effectively perpendicular to the force lines of the levers at substantially the mid-load positions of the levers.

WILLIAM GUMPRICH.